F. BARTA, Jr.
VEHICLE WHEEL.
APPLICATION FILED AUG. 27, 1912.
1,057,916.
Patented Apr. 1, 1913.
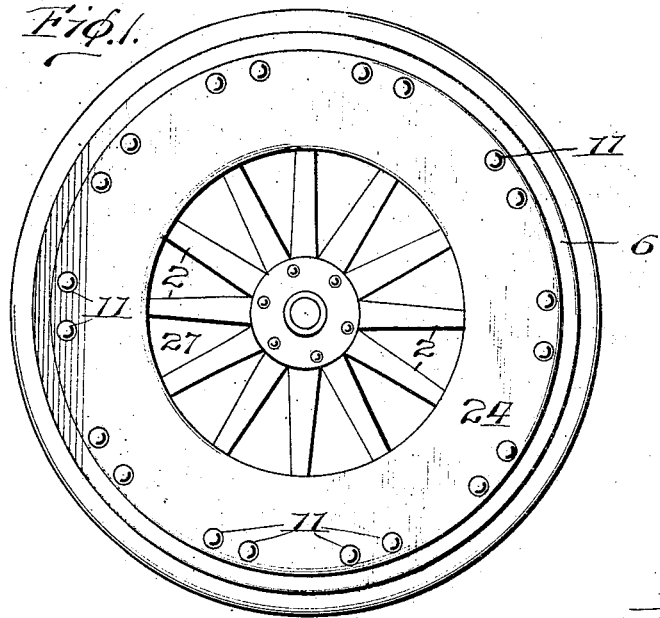
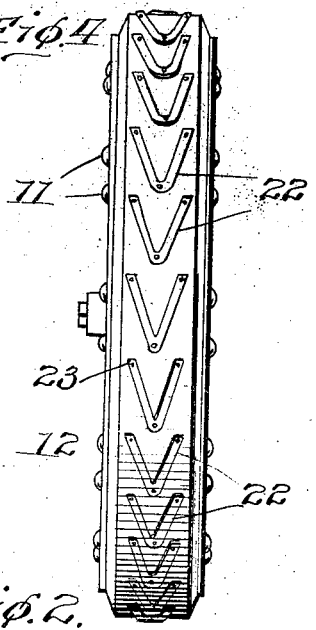
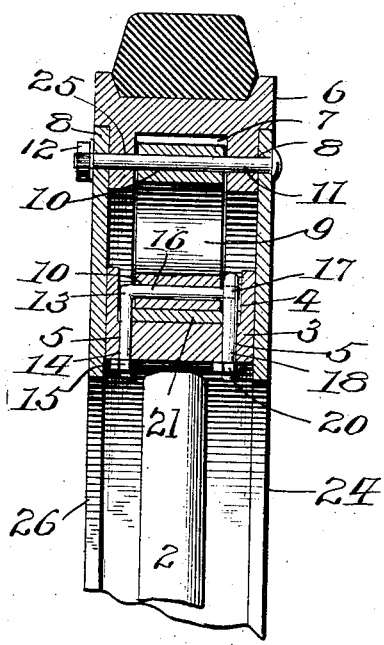
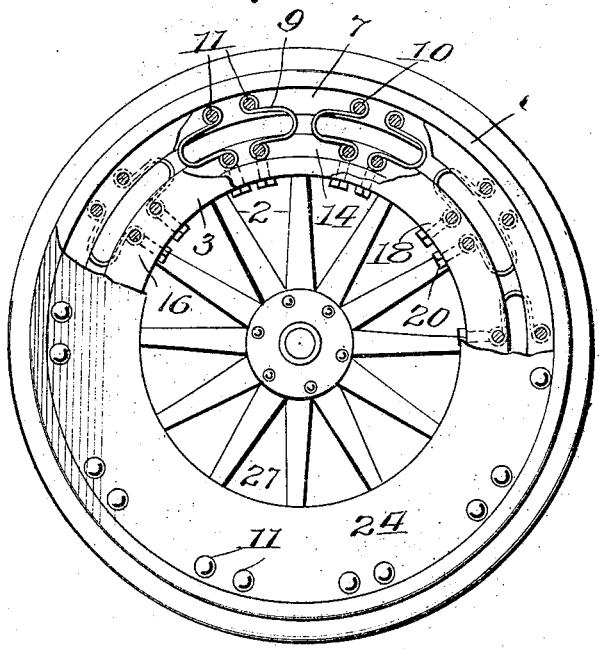
Inventor
Frank Barta Jr.

UNITED STATES PATENT OFFICE.

FRANK BARTA, JR., OF DEERFIELD, MONTANA.

VEHICLE-WHEEL.

1,057,916.  Specification of Letters Patent.  Patented Apr. 1, 1913.

Application filed August 27, 1912. Serial No. 717,385.

*To all whom it may concern:*

Be it known that I, FRANK BARTA, Jr., a citizen of the United States of America, residing at Deerfield, in the county of Fergus and State of Montana, have invented new and useful Improvements in Vehicle-Wheels, of which the following is a specification.

This invention relates to improvements in vehicle wheels and has particular application to spring wheels.

In carrying out the present invention, it is my purpose to provide a wheel whereby the use of pneumatic tires and the like are eliminated and which will possess the qualities of a rubber tired wheel and avoid the objections inherent therein incident to punctures, blow-outs and the like.

Furthermore, I aim to provide a spring wheel which may be readily knocked down or taken apart for repairs in the event that one or more of the springs should become fractured or broken thereby enabling the repairing of such spring or the replacing thereof as the case may be.

It is also my purpose to provide a wheel of the class described which will embrace the desired features of simplicity, efficiency and durability coupled with cheapness of cost in manufacturing and marketing and which will operate effectively to prevent the transmission of shocks or jars to the vehicle to which the wheel is applied.

With the above and other objects in view, the invention consists in the construction, combination and arrangement of parts hereinafter set forth in and falling within the scope of the claim.

In the accompanying drawing: Figure 1 is a side elevation of a vehicle wheel constructed in accordance with the present invention. Fig. 2 is a similar view, one of the side plates of the wheel being removed and parts broken away. Fig. 3 is an enlarged fragmentary transverse sectional view through the wheel, and Fig. 4 is a fragmentary view looking at the periphery of the wheel.

Referring now to the accompanying drawing in detail, the numeral 1 indicates the hub of the wheel constructed in any suitable manner and adapted to fit upon the spindle end of a vehicle axle, while 2 denotes the spokes radiating from the hub. Connected to the free ends of the spokes 2 is an inner ring 3 formed, in the present instance, with a peripheral channel 4 having formed in the bottom wall thereof pairs of transversely alining bores 5, 5 suitably spaced apart about the circumference of the ring. Arranged concentrically of the inner ring 3 and spaced apart therefrom a suitable distance is an outer ring 6 provided with a circumferential channel 7 in the inner face thereof, the walls of such channel being provided with axially alining bores 8, 8 spaced apart about the ring. Interposed between the juxtaposed surfaces of the rings 3 and 6 are springs 9 each, in the present instance, of substantially U-shape and having the opposite ends thereof turned upon themselves to provide eyes 10, 10. One eye terminal of each spring is disposed within the channel 7 in the inner surface of the outer ring 6 and alines with a pair of axially alining openings 8, 8 in the walls of such channel and through the alining openings 8, 8 and the respective eye terminals of the springs are passed headed bolts 11 having nuts 12 threaded onto the shanks thereof. The opposite eye terminals of the springs are exposed within the channel 4 in the inner ring 3 and the terminal of each spring is arranged between the bores 5, 5 of the transversely alining pair. These transversely alining bores 5, 5 in the inner ring of the wheel carry clamps which are passed through the respective terminals of the springs and serve to securely hold the latter to the inner ring. Each clamp comprises an angle bolt 13 having a vertical threaded leg 14 passed through one bore of the respective alining pair and carrying a nut 15 on the threaded extremity thereof, while the horizontal leg 16 of such angle bolt is passed through the eye terminal of the respective spring and disposed within the eye portion 17 of an eye bolt 18 having a threaded shank 19 passed through the other bore of the respective pair and carrying a nut 20. Thus, by loosening the nuts 15 and 20 of each clamp, the angle and eye bolts constituting such clamp may be withdrawn from the respective bores and this terminal of the spring detached from the inner ring. To completely remove the spring from the wheel, the bolt 11 holding the other end thereof to the outer ring, is withdrawn, as will be readily understood.

Interposed between the eye terminal of each spring within the channel 4 in the inner ring 3, and the lower wall of such channel, is a wear plate 21 having openings therein alining with the bores in the channel so that the bolts of the respective clamping element may be passed therethrough, this wear plate eliminating contact between the lower wall of the channel and the respective terminal of the spring, thereby avoiding mutilation of the inner spring under the action of the terminal of the spring.

The peripheral or tread surface of the outer ring 6 is preferably provided with gripping shoes 22 which, in the present instance, are V-shaped and fastened to the tread surface of the said ring through the medium of screws 23.

At one side of the assembled wheel is a ring-like plate 24 fitted within an annular rabbet 25 in the respective side edge of the outer ring 6, the plate 24 being provided with bolt holes adjacent to its peripheral edge which are adapted to aline with the similar holes 8 in the respective side wall of the channel 7 and receive the bolts 11, while a similar plate 26 is fastened to the other side wall of the wheel in a manner identical to the securing of the plate 24, these plates, being of ring-like construction, permitting relative movement of the rings constituting the wheel so as to eliminate the transmission of shocks and jars.

From the foregoing description taken in connection with the accompanying drawing, the construction and manner of employing my invention will be readily apparent. It will be seen that I have provided a spring wheel which may be readily taken apart for repairs and which will operate effectively to prevent the transmission of jar or shock to the body of the vehicle to which the wheel is applied.

While I have herein shown and described one preferred form of my invention by way of illustration, I desire it to be understood that I do not limit or confine myself to the precise details of construction herein described and delineated, as modification and variation may be made within the scope of the claim and without departing from the spirit of the invention.

I claim:

A wheel comprising an inner ring having a circumferential channel in the periphery thereof and provided with pairs of transversely alining bores in the bottom wall of the channel, an outer ring disposed concentrically of the inner ring and spaced apart therefrom and having a circumferential channel in the inner surface thereof provided with axially alining bores in the side walls thereof, said last-named ring having the side walls thereof formed with annular rabbets, ring-like plates disposed within said rabbeted portions and embracing said first-named ring, springs interposed between said rings and having the ends thereof disposed in said channel, bolts passed through the axially alining bores in said outer ring and through the ends of the springs in the channel in said ring, and clamps disposed within the channel of said inner ring and in engagement with the ends of the springs in such channel, said clamps each comprising an angle bolt having a threaded leg passed through one bore of an alining pair, and a horizontal leg in engagement with the adjacent end of the respective spring, an eye bolt having a threaded shank passed through the remaining bore of the respective pair and receiving the free end of the horizontal leg of said angle bolt, and nuts on the threaded portions of said bolts.

In testimony whereof I affix my signature in presence of two witnesses.

FRANK BARTA, Jr.

Witnesses:
 JOSEF NOSEK,
 JOSEPH F. KOSTATRIS.